(12) United States Patent
Shibatani (10) Patent No.: US 7,965,457 B2
(45) Date of Patent: Jun. 21, 2011

(54) VIBRATORY DRIVING DEVICE

(75) Inventor: Kazuhiro Shibatani, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/779,423

(22) Filed: May 13, 2010

(65) Prior Publication Data

US 2010/0296184 A1 Nov. 25, 2010

(30) Foreign Application Priority Data

May 19, 2009 (JP) ................................. 2009-120640

(51) Int. Cl.
 *G02B 7/02* (2006.01)
 *G02B 15/14* (2006.01)
(52) U.S. Cl. .......................... 359/824; 359/823; 359/694
(58) Field of Classification Search .................. 359/555, 359/557, 694–700, 811–824; 396/52–55; 348/208.1–208.13; 310/323.02, 32
 See application file for complete search history.

(56) References Cited

U.S. PATENT DOCUMENTS

| | | | |
|---|---|---|---|
| 6,111,336 A | * | 8/2000 | Yoshida et al. ............... 310/328 |
| 7,531,941 B2 | * | 5/2009 | Manabe .................... 310/323.02 |

FOREIGN PATENT DOCUMENTS

| | | |
|---|---|---|
| JP | 2005-284169 A | 10/2005 |
| JP | 2006-113874 A | 4/2006 |

* cited by examiner

*Primary Examiner* — Mohammed Hasan
(74) *Attorney, Agent, or Firm* — Brinks Hofer Gilson & Lione (57) ABSTRACT

A vibratory driving device 1 comprising a shaft-like driving member 7, a electromechanical transducer 6 which can incline the driving member 7 and which can also displace the driving member 7 in the axial direction of the driving member, a movable member 8 which slidably engages on the driving member 7, a driving circuit 3 which can apply to the electromechanical transducer 6 a periodical frictional driving voltage to displace slidingly the movable member with respect to the driving member and an inclination driving voltage inclining the driving member, a waveform determiner 4 which determines a rising condition of a voltage or a current of the electromechanical transducer 6 when the inclination driving voltage is applied, and a position estimator which estimates a position of the movable member 8 based on the rising condition of a voltage or a current.

8 Claims, 10 Drawing Sheets

VIBRATORY DRIVING DEVICE

This application is based on application No. 2009-120640 filed in Japan, the contents of which are hereby incorporated by reference.

FIELD OF THE INVENTION

The present invention relates to a vibratory driving device.

DESCRIPTION OF THE RELATED ART

It is publicly known a vibratory driving device which oscillates a driving member in its axial direction with a speed varying asymmetrically by a electromechanical transducer to displace slidingly with respect to the driving member a movable member which slidably engages on the driving member. In the vibratory driving device, a displacing amount of the movable member per cycle of a driving voltage applied to the electromechanical transducer is not precisely constant. Therefore, an actual position of the movable member is possibly offset from a position estimated based on the driving voltage (in a case of a pulse driving, a position moved a distance proportional to the number of pulses).

For this reason, in the case of positioning with a conventional vibratory driving device, it is required to provide a sensor and a circuit dedicated to detecting a position of the movable member, as described in the JP 2006-113874 A and the JP 2005-284169 A, hence a cost up and a growing in size are caused.

SUMMARY OF THE INVENTION

In view of the above problem, it is an object of the present invention to provide a driving device capable of detecting a position of a movable member with simple construction.

In order to achieve the objects of the present invention, there is provided a vibratory driving device comprising a shaft-like driving member, a electromechanical transducer which can incline the driving member and which also can displace the driving member in the axial direction of the driving member, a movable member which slidably engages on the driving member, a driving circuit which can apply to the electromechanical transducer a periodical frictional driving voltage displacing the driving member back and forth with a speed varying asymmetrically in the axial direction to displace slidingly the movable member with respect to the driving member and an inclination driving voltage inclining the driving member, a waveform determiner which determines a rising condition of a current or a voltage of the electromechanical transducer when the inclination driving voltage is applied, and a position estimator which estimates a position of the movable member based on the rising condition of the voltage or the current.

In accordance with this constitution, since the moment of inertia of the driving member together with the movable member changes according to the engaging position of the movable member, a magnitude of a reaction force subjected to the electromechanical transducer from the driving member while the electromechanical transducer inclines the driving member varies. Therefore, a rising waveform of a voltage or a current of the electromechanical transducer varies according to the engaging position of the movable member. Consequently, based on this rising condition, the engaging position of the movable member can be estimated.

In the vibratory driving device according to the present invention, the electromechanical transducer may have a plurality of, typically two, elongatable portions which can elongate and contract in the axial direction of the driving member respectively and which are provided in parallel with each other, and the electromechanical transducer may hold one end of the driving member.

In accordance with this constitution, by applying uniform voltage, all of the elongatable portions elongate and contract simultaneously so as to displace the driving member in the axial direction. And also, by applying different voltages to the elongatable portions, a difference in the dimension between the elongatable portions can be caused so as to incline the driving member.

In the vibratory driving device according to the present invention, the waveform determiner may determine the rising condition by applying a voltage to some of the elongatable portions and detecting a voltage or a current induced in another elongatable portion.

In accordance with this constitution, since any voltage is not applied to the elongatable portion detecting the rising condition, no power source voltage is applied to a circuit determining a rising waveform, and so accurate measurement can be achieved.

In the vibratory driving device according to the present invention, the electromechanical transducer may elongate and contract in the axial direction of the driving member and be partially restrained so as to restrict the elongation and contraction of the electromechanical transducer in an imbalanced manner.

In accordance with this constitution, only one system of driving circuit is required.

In the vibratory driving device according to the present invention, the position estimator may estimate the position of the movable member based on a difference between a rising waveform of the voltage or the current of the electromechanical transducer and a predetermined referential waveform.

In accordance with this constitution, the referential waveform is preset as a waveform when the movable member is located at a reference position, thereby the engaging position of the movable member can be specified based on the difference between a determined rising waveform.

Furthermore, an optical apparatus according to the present invention comprises the aforesaid vibratory driving device and an optical member held by the movable member of the vibratory driving device, wherein the optical member is positioned based on a position of the movable member estimated by the position estimator.

According to the present invention, a position of the movable member is estimated, by detecting rising condition of a voltage or a current of the electromechanical transducer with the inclination driving voltage inclining the driving member applied and thereby detecting a variance in rising condition of a voltage or a current of the electromechanical transducer due to the variance of the moment of inertia of the driving member according to the engaging position of the movable member.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENT

Figure 1:
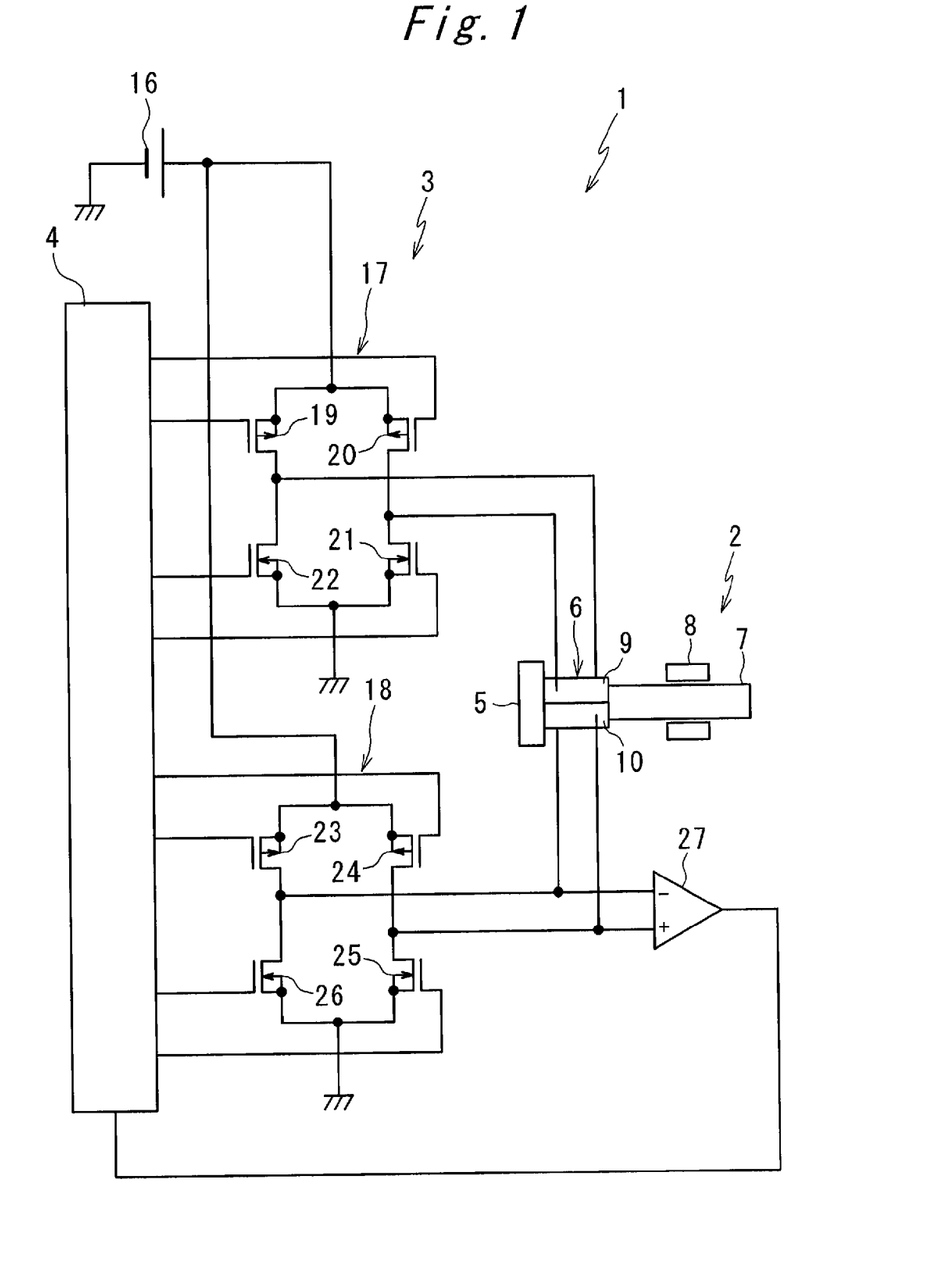
FIG. 1 is a circuit diagram of a vibratory driving device as first embodiment according to the present invention.

Hereinafter, embodiments of the present invention will be described referring to the drawings. FIG. 1 shows a vibratory driving device 1 as first embodiment according to the present invention. The vibratory driving device 1 has an actuator 2 as a mechanically constructional element, a driving circuit 3 for driving the actuator 2, and a controller 4 consisting of a microcomputer.

Figure 2:
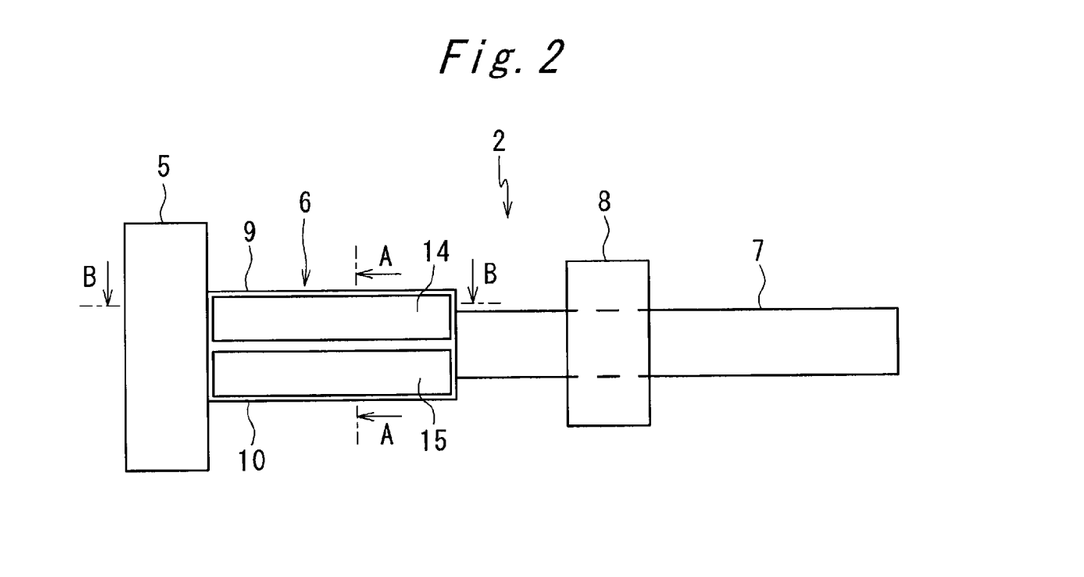
FIG. 2 is a side view of an actuator of the driving device in FIG. 1.
Figure 3:
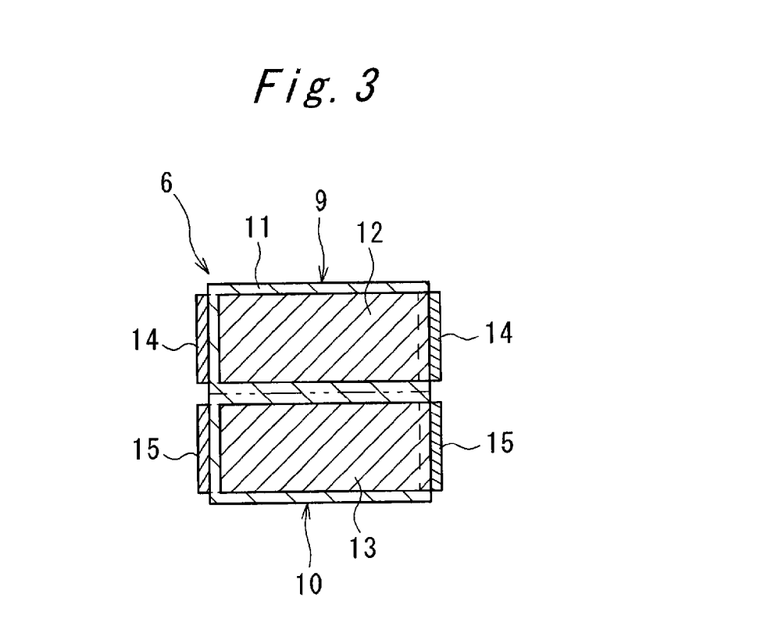
FIG. 3 is a sectional view at A-A in FIG. 2.
Figure 4:
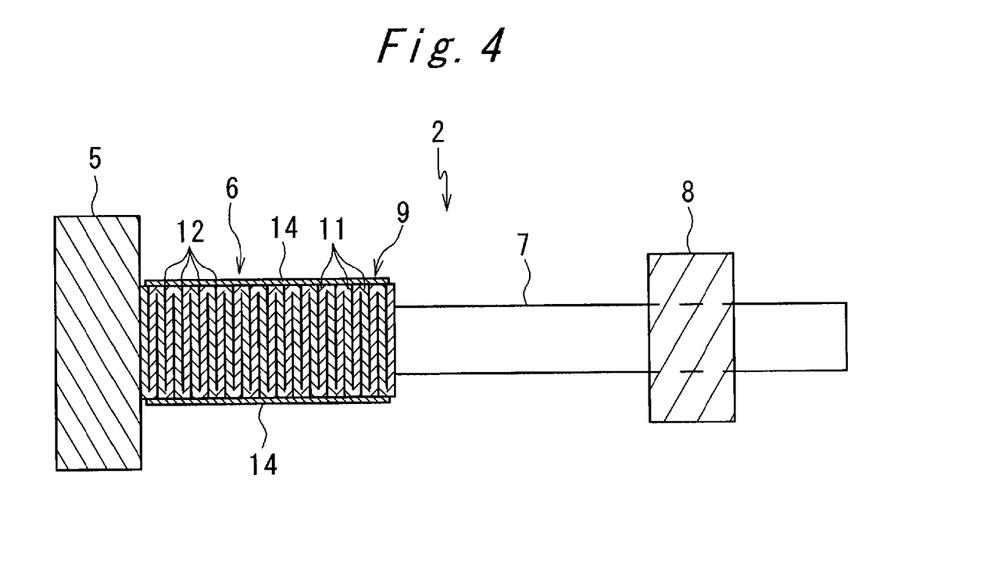
FIG. 4 is a sectional view at B-B in FIG. 2.

FIGS. 2 to 4 show details of the actuator 2. The actuator 2 comprises a weight 5, a piezoelectric element (electromechanical transducer) 6 of which on end is fixed to the weight 5, a shaft-like driving member 7 of which one end is fixed to the other end of the piezoelectric element 6, a movable member 8 engaging in a slidingly displaceable manner on the driving member 7. The piezoelectric element has a pair of elongatable portions 9, 10 which can elongate and contract in an axial direction of the driving member 7 respectively and which are provided in parallel with each other.

As shown in FIGS. 3, 4, the piezoelectric element 6 is made by stacking up sheet formed piezoelectric layers 11 on which individually two print electrodes 12, 13 are printed, and forming external electrodes 14, 15 to connect every other print electrodes 12, 13. In the piezoelectric element 6, by applying a voltage between the both external electrodes 14, the elongatable portion 9, that is a portion with interposition of the print electrodes 12, elongates and contracts according to the applied voltage, and by applying a voltage between the both external electrode 15, the elongatable portion 10 with the print electrode 13 interposed elongates and contracts according to the applied voltage. This means that elongatable portion 9 and elongatable portion 10 are provided in parallel with each other in a manner that enables elongatable portions 9, 10 to elongate and contract in an axial direction of the driving member 7 respectively.

With referring FIG. 1 again, the driving circuit 3 applying a voltage to the piezoelectric element 6 will be explained. The driving circuit 3 has two bridge circuits 17, 18 which can connect respectively the both electrodes 14 or 15 of the elongatable portions 9 or 10 of the piezoelectric element 6 to a direct current source 16 or the ground under a control of the controller 4. The bridge circuits 17, 18 have FETs 19, 20, 21, 22 or FETs 23, 24, 25, switchingly operated by a control signal of the controller 4.

When the bridge circuits 17 and 18 output even voltage so as to apply coordinate phase voltages to the external electrode 14 and 15, the elongation and the contraction portions 9 and 10 elongate and contract in same direction so as to displace driving member 7 in the axial direction. By rapidly contracting the elongatable portions 9, 10 after slowly elongating, the movable member 8 can be slidingly displaced on the driving member 7 so as to move the movable member 8 away from the piezoelectric element 6. Therefore, for moving the movable member 8 away from the piezoelectric element 6, the driving circuit 3 applies frictional driving voltage in the same phase, for instance, of a periodical rectangular waveform with frequency of 350 kHz and duty ratio of 300, to the external electrodes 14 and 15, and for moving the movable member 8 closer to the piezoelectric element 6, the driving circuit 3 applies frictional driving voltage in the same phase, for instance, of a periodical rectangular waveform with frequency of 350 kHz and duty ratio of 70%, to the external electrodes 14 and 15.

Figure 5:
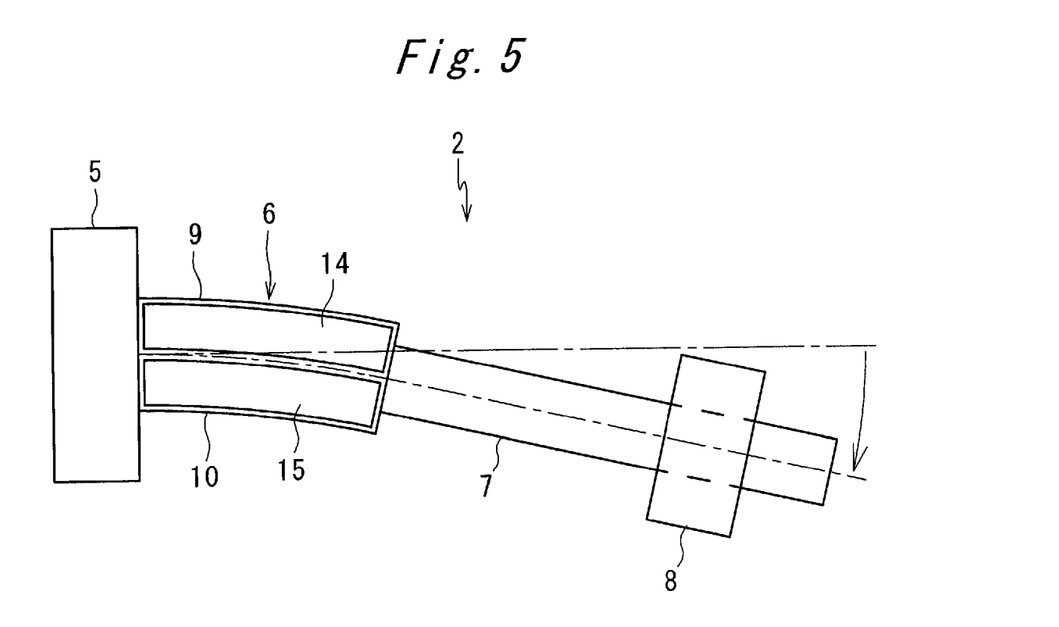
FIG. 5 is a side view showing an inclined state of the actuator in FIG. 2.

Further, the driving circuit 3 can output an inclination driving voltage to apply the power source voltage to only the elongatable portion 9 and to disconnect the elongatable portion 10 from the direct current source 16 and the ground. Specifically, the inclination driving voltage is output by turning on the FET 20 and the FET 22 and turning off the FET 19 and the FET 21 of the bridge circuit 17, and turning on the FET 23 and the FET 24 and turning off the FET 25 and the FET 26 of the bridge circuit 18. With this inclination driving voltage applied to the piezoelectric element 6, as shown in FIG. 5, a difference in length is caused between the elongatable portion 9 and the elongatable portion 10, hence the piezoelectric element 6 curves so as to incline the driving member 7 held on the end of the piezoelectric element 6.

Furthermore, the vibratory driving device 1 has a difference operator (waveform determiner) 27 which outputs difference of electrical potential between both ends of the elongatable portion 10 that is a voltage between the both electrodes 15. The output of the difference operator 27 is input into the controller 4.

Figure 6:
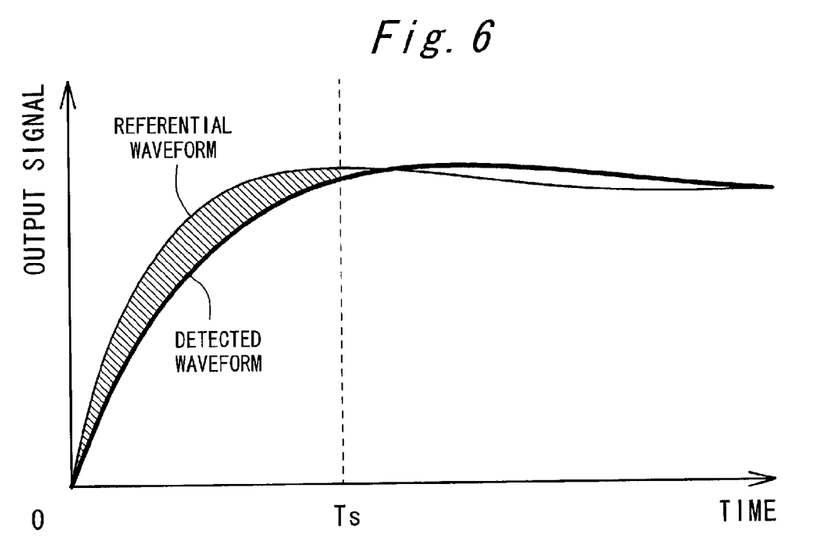
FIG. 6 is a chart showing rising waveform of the vibratory driving device through an inclination driving.

FIG. 6 shows output waveform of the difference operator 27 when the inclination driving voltage is applied. the inclination driving voltage is a step input which is rise to the power source voltage in a moment at the time "0". Since the elongatable portions 9, 10 have elasticity, the elongatable portions 9, 10 elongate behind the inclination driving voltage. Further, the moment of inertia of the driving member 7 and the movable member 8 delay the bending of the piezoelectric element 6 (elongation of the elongatable portions 9, 10). Between the both electrodes 15, an electrical voltage proportional to elongation amount of the elongatable portion 10 is induced, and therefore the output of the difference operator 27 represent a rising waveform delayed with respect to the step input due to the elasticity of the piezoelectric element 6 and the moment of inertias of the driving member 7 and the movable member 8.

The controller 4 memorizes, as a referential waveform, a output waveform of the difference operator 27 in the case where the movable member 8 engages at the end of the driving member 7 on the side of piezoelectric element 6. In a case where the movable member 8 engages at a point far from the piezoelectric element 6, the moving radius of the movable member 8 is larger so as to increase the moment of inertia of the movable member 8, hence the rising waveform of the difference operator 27 gets larger delay than that of the referential waveform as shown in the figure.

The controller 4 integrates the deference between the referential waveform and the waveform of the difference operator 27 up to the rise time Ts of the referential waveform to calculate a area of the hatched range in the figure. This area of the hatched range represents the increase of the moment of inertia of the movable member 8. Therefore, the controller 4 memorizes a look-up table relating the area of the hatched range to the position of the movable member 8, and estimates the position of the movable member 8 based on the deference between the referential waveform and the waveform of the difference operator 27 (position estimator).

In this embodiment, the position of the movable member 8 is estimated based on a value of integral of the deference between the referential waveform and the waveform of the difference operator 27 up to the rise time Ts. However, the position of the movable member 8 may be estimated using a look-up table relating an inclination of the rising waveform of the difference operator 27 or another index of rising condition of the voltage or the current such as a time for approaching predetermined voltage, to the position of the movable member 7.

Figure 7:
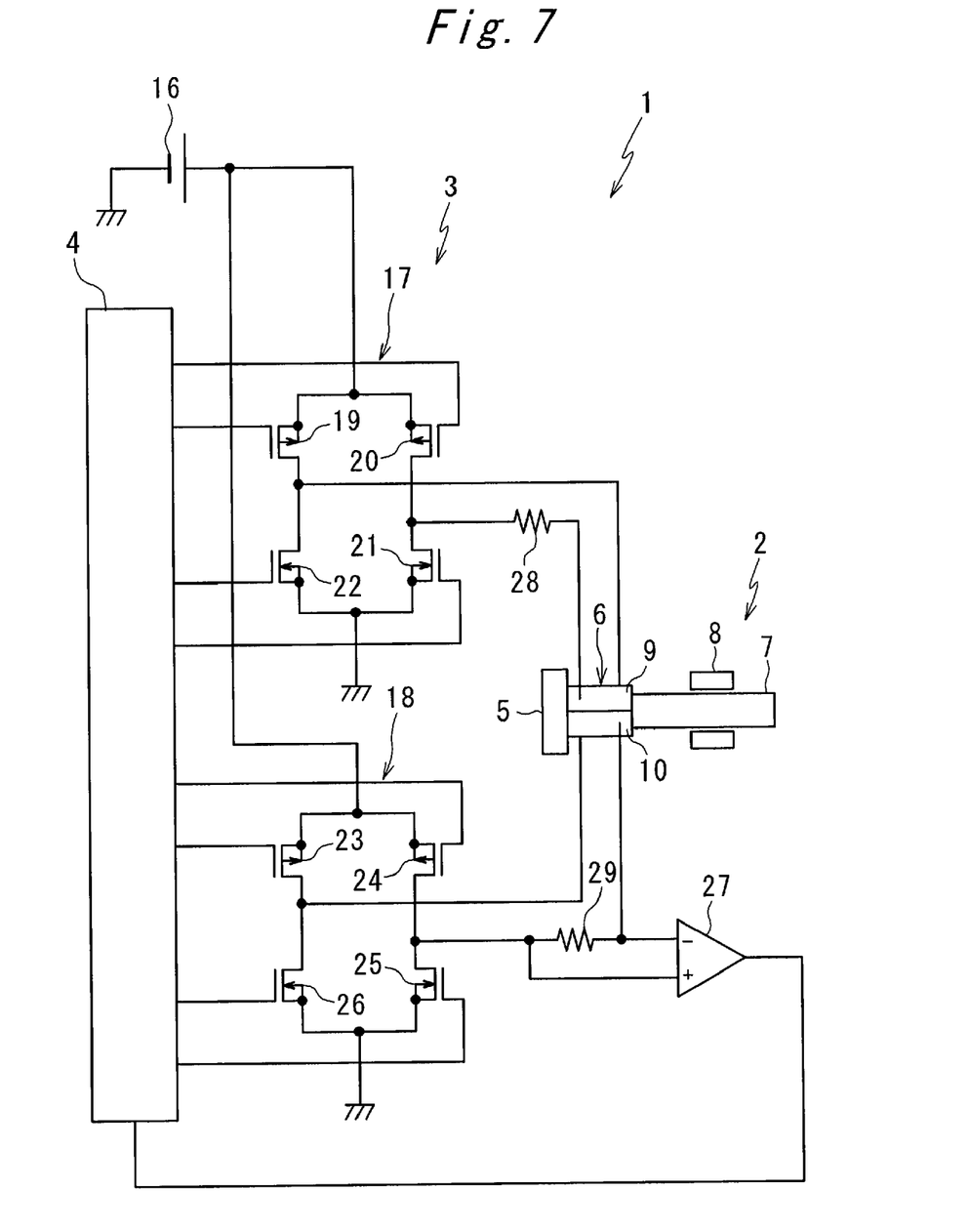
FIG. 7 is a circuit diagram of a vibratory driving device as second embodiment according to the present invention.

Next FIG. 7 shows a configuration of a vibratory driving device 1 as second embodiment according to the present invention. It is to be noted that in the following description of the preferred embodiment of the present invention, components identical to those described before are designated by identical reference numerals to omit redundant explanation.

The vibratory driving device 1 of this embodiment has detecting resisters 28, 29 on the electrical path between the driving circuit 3 and the piezoelectric element 6. The difference operator 27 outputs a difference of electrical potential between both ends of the detecting resister 29.

Further, in this embodiment, the driving circuit 3 can output an inclination driving voltage which applies the power source voltage to only the elongatable portion 9 and short-circuits between both electrodes 15 of the elongatable portion 10. Specifically, the inclination driving voltage is output by turning on the FET 20 and the FET 22 and turning off the FET 19 and the FET 21 of the bridge circuit 17, and turning on the FET 23 and the FET 24 and turning off the FET 25 and the FET 26 of the bridge circuit 18.

In this embodiment, when the inclination driving voltage is applied, through the elongatable portion 10, a current proportional to the dimensional displacement of the elongatable portion 10 via the detecting resister 29 flows. The difference operator 27 detects the current through the elongatable portion 10 as a voltage drop in the detecting resister 29.

Also in this embodiment, the controller 4 estimates the position of the movable member 8 based on the rising waveform of the difference operator 27.

Figure 8:
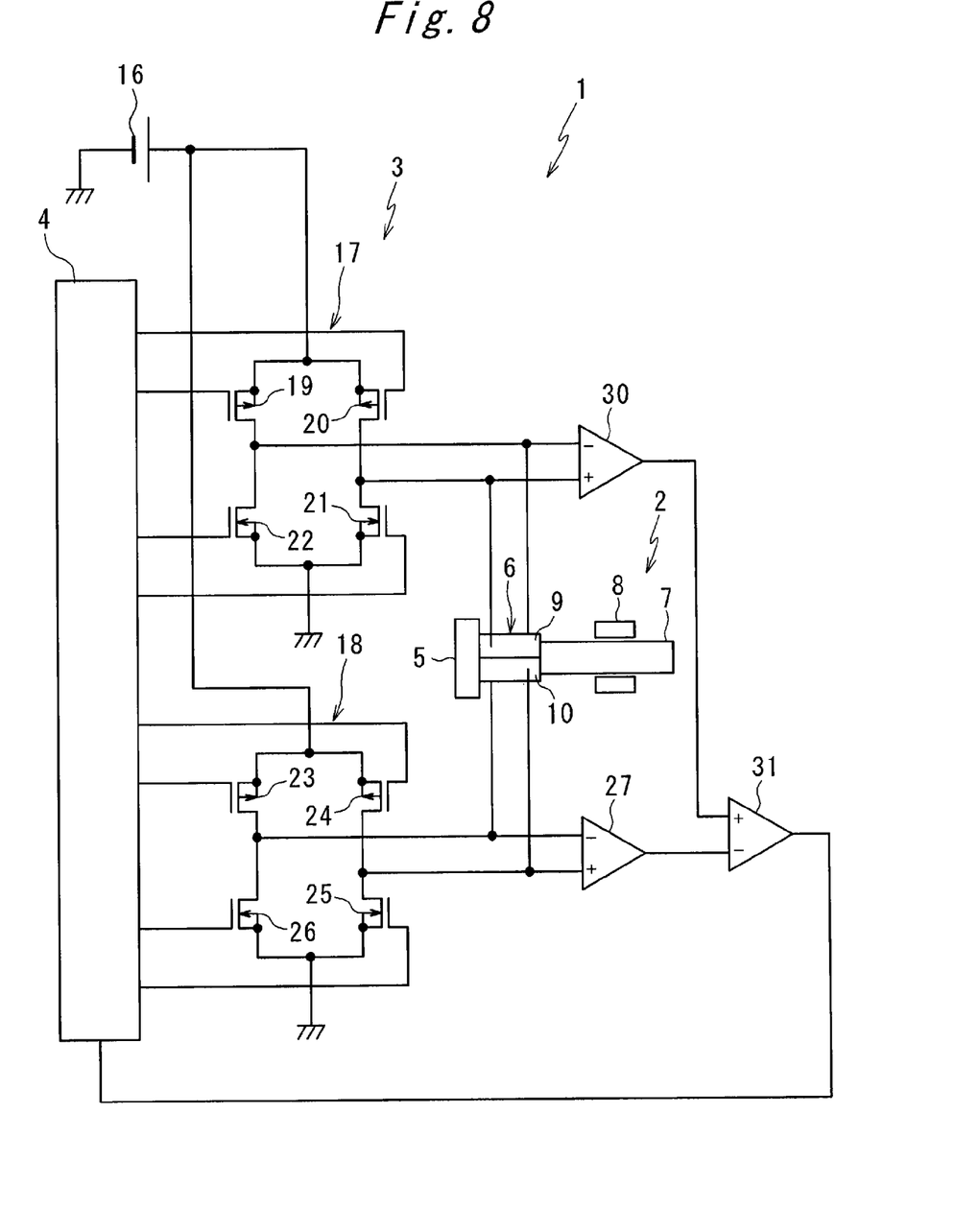
FIG. 8 is a circuit diagram of a vibratory driving device as third embodiment according to the present invention.

FIG. 8 shows a configuration of a vibratory driving device 1 as third embodiment according to the present invention. This vibratory driving device 1 has a difference operator 30 detecting difference of electrical potential between both ends of the elongatable portion 9, and a comparator 31 outputting a difference between the output of the difference operator 27 and the output of the difference operator 30. Into the controller 4, the output of the comparator 31 is input.

In this embodiment, the driving circuit also can output an inclination driving voltage which applies the power source voltage in reverse polarity to the elongatable portion 9 and the elongatable portion 10. Specifically, the inclination driving voltage is output by turning on the FET 20 and the FET 22 and turning off the FET 19 and the FET 21 of the bridge circuit 17, and turning on the FET 24 and the FET 26 and turning off the FET 23 and the FET 25 of the bridge circuit 18.

The difference operator 27 and the difference operator 30 detect a voltage which is sum of the power source voltage and a voltage proportional to the dimensional displacement of the elongatable portion 9 or the elongatable portion 10. Since the elongatable portion 9 and the elongatable portion 10 are applied reverse polar voltages, the outputs of the difference operator 27 and the difference operator 30 are in reveres operator polarity. Therefore, the comparator 31 output a voltage which is sum of absolute values of outputs of the difference operator 27 and the difference operator 30.

In this embodiment, since the both of the elongatable portions 9 and 10 are driven, the inclination angle of the driving member 7 is larger, and therefore the delay in elongation and contraction of the piezoelectric element 6 due to the moment of inertia of the movable member 8 is longer. Moreover, even if the delay in elongation and contraction due to the moment of inertia of the movable member 8 is shorter because of gravity center offset of the movable member 8 and others, the position of the movable member 8 can be accurately estimated, because both of electromotive forces of the elongatable portions 9 and 10 are detected.

Figure 9:
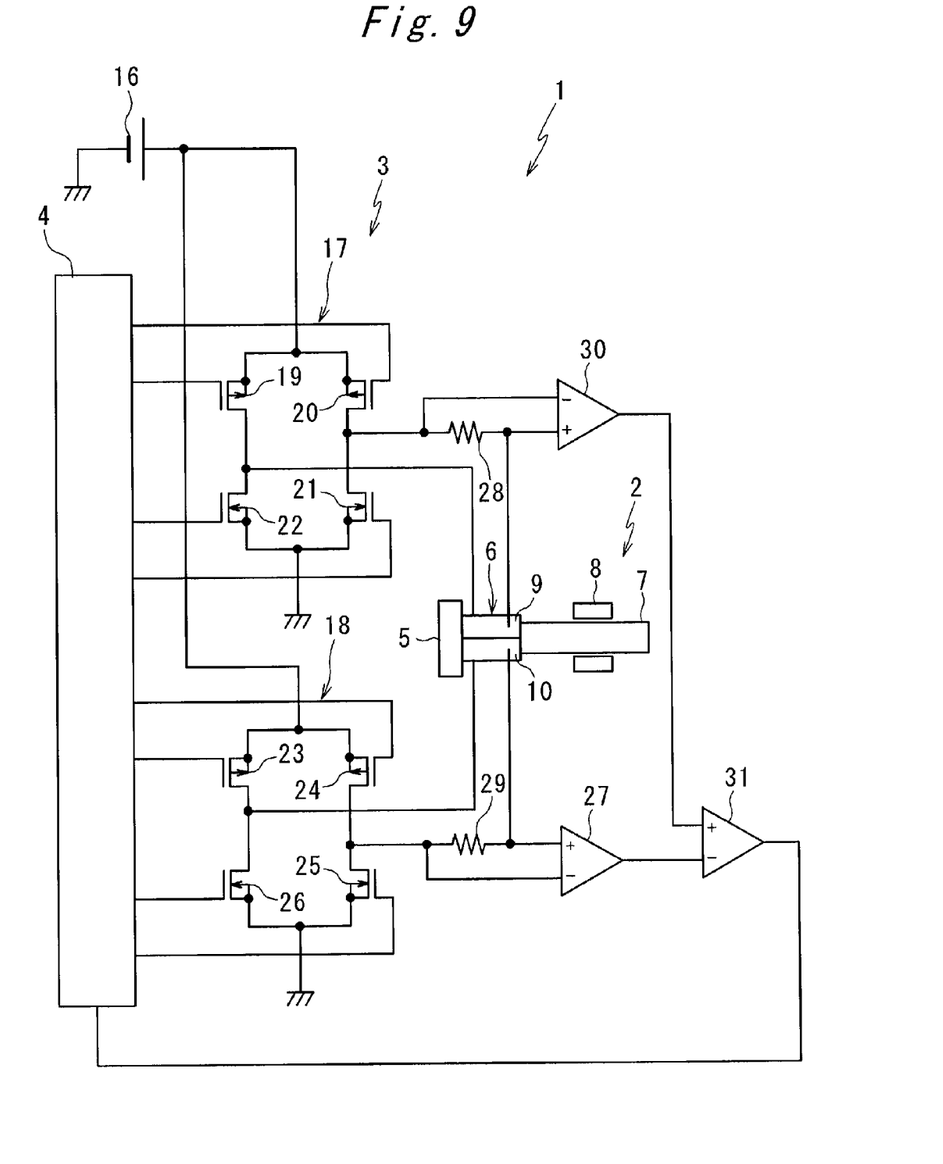
FIG. 9 is a circuit diagram of a vibratory driving device as fourth embodiment according to the present invention.

Alternatively, as in a vibratory driving device 1 as forth embodiment according to the present invention shown in FIG. 9, rising waveforms of the elongatable portion 9 and the elongatable portion 10 may be detected by the difference operator 27 and the difference operator 30.

Figure 10:
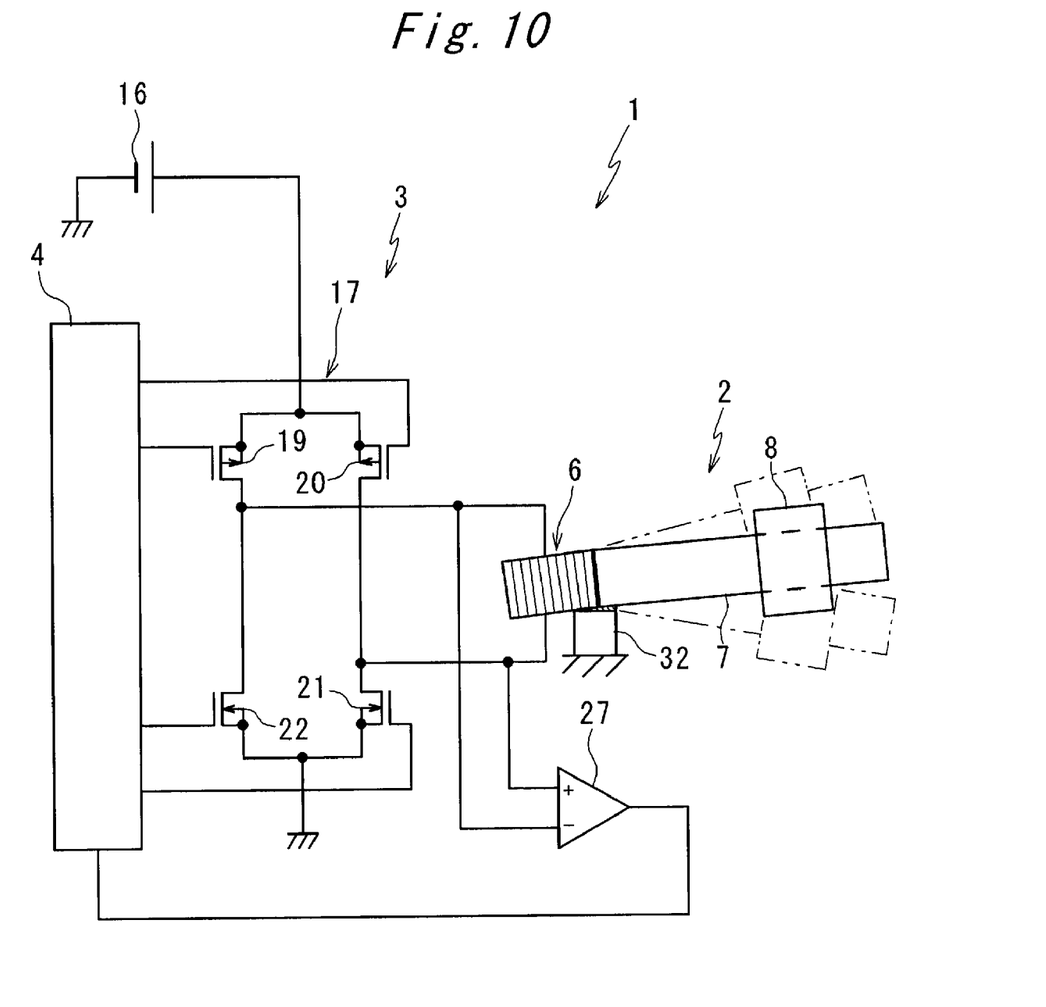
FIG. 10 is a circuit diagram of a vibratory driving device as fifth embodiment according to the present invention.

Furthermore, FIG. 10 shows a configuration of a vibratory driving device 1 as fifth embodiment according to the present invention. This vibratory driving device 1 has a piezoelectric element 6 consisting of one elongatable portion and a restraint member 32 which restrain partially the lower side of the piezoelectric element 6 to restrict the elongation and contraction of the piezoelectric element 6.

The piezoelectric element 6 elongates and contracts with a voltage applied. However, the piezoelectric element 6 is restricted its elongation and contraction in an imbalanced manner by the restraint member 32, hence the piezoelectric element 6 strains in an imbalanced manner on the restraint member 32 as shown in the figure so as to incline the driving member 7. Specifically, in the case where one side of the bonded portion of the piezoelectric element 6 and the driving member 7 is fixed to the restraint member 32 with an adhesive as this embodiment, when a voltage elongating the piezoelectric element 6 is applied, the side of the bonded faces of the piezoelectric element 6 and the driving member 7 where is not held by the restraint member 32 (upper side) moves to the side of the piezoelectric element 6, so as to incline the distal end of the driving member 7 to the side opposite to the restraint member 32.

The driving circuit 3 of this embodiment has only one bridge circuit 17. Further, in this embodiment, the driving circuit 3 applies to the piezoelectric element 6 a periodical rectangular formed frictional driving voltage having a frequency of 350 kHz and a duty ratio of 30% or 70% to displace slidingly the movable member 8 on the driving member 7. Also, the driving circuit 3 outputs an inclination driving voltage applying the power source voltage as a step form to incline the driving member 7 to estimate the position of the movable member 8.

In this embodiment, since the rising waveform of the deference operator 27 is formed as a sum of the power source voltage and an electromotive force of the piezoelectric element 6, the position of the movable member can be estimated based on the rising waveform of the deference operator 27.

Figure 11:
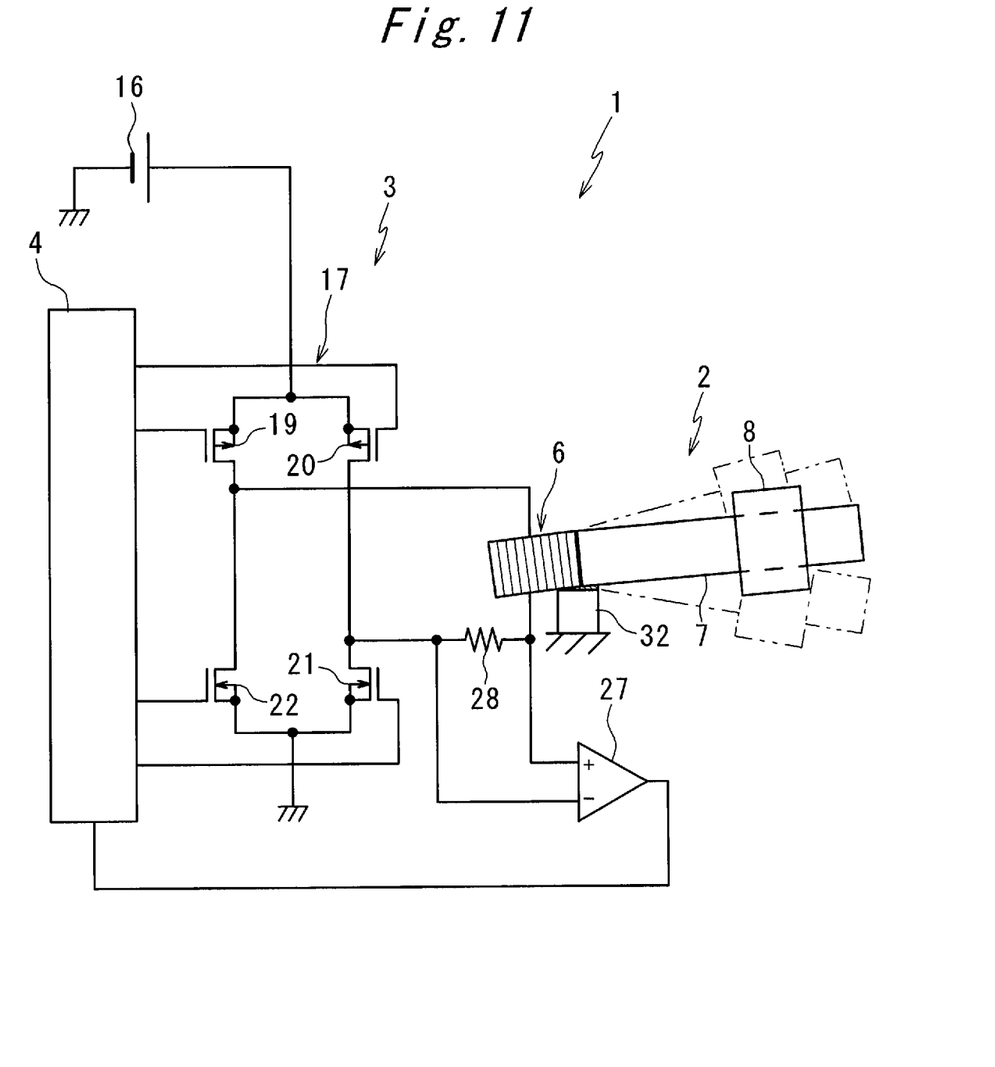
FIG. 11 is a circuit diagram of a vibratory driving device as sixth embodiment according to the present invention.

Alternatively, as in sixth embodiment according to the present invention shown in FIG. 11, a vibratory driving device 1 may be configured to detect a current of the piezoelectric element 6 which is restrained in an imbalanced manner by the restraint member 32.

Figure 12:
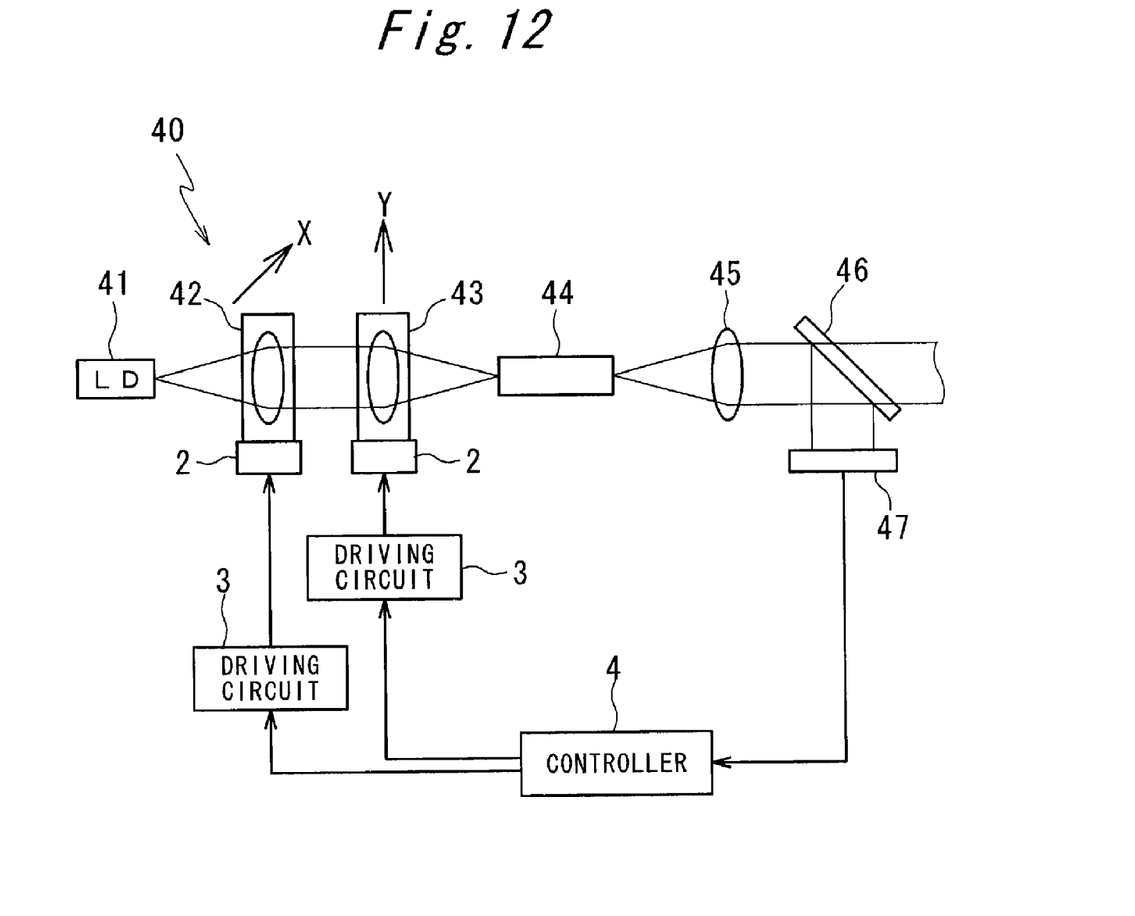
FIG. 12 is a schematic diagram of an optical apparatus using a vibratory driving device according to the present invention.

In addition, FIG. 12 shows a configuration of a laser module 40 as an optical device using vibratory driving devices 1 according to the present invention. The laser module 40 has a laser diode 41 for generating an infrared laser beam, a X-axis movable alignment lens 42 and a Y-axis movable alignment lens 43 for guiding the laser beam, a second harmonic generator 44 for receiving the laser beam and producing a green laser beam with half-wave length of the infrared laser beam, and an emission lens 45 for emitting output beam of the second harmonic generator 44.

The X-axis movable alignment lens 42 is held by the movable member 8 of the actuator 2 of above described vibratory driving device 1 and positioned by the actuator 2 in X direction orthogonal to an optical axis of the laser beam. The Y-axis movable alignment lens 43 is held by the movable member 8 of another actuator 2 and positioned by the associated actuator 2 in Y direction orthogonal to an optical axis of the laser beam and the X direction. Two driving circuits 3 driving the respective vibratory driving devices 1 are controlled by one controller 4.

The laser module 40 further has a beam splitter 46 for splitting the output beam from the second harmonic generator 44, a power monitor 47 composed of a sensor such as photodiode for converting an output level of the split output beam from the second harmonic generator 44 into a voltage signal. The controller 4 controls the operations of the driving circuits 3 in response to output of the power monitor 47.

A light receiving part of the second harmonic generator 44 has an aperture on the order of 1 to 3 μm. The alignment lenses 42, 43 cooperatively focus the laser beam so that the laser beam has a diameter on the same order as the aperture of the light receiving part of the second harmonic generator 44 and aligns an optical axis of the laser beam with a center of the light receiving part of the second harmonic generator 44. When the optical axis of the laser beam is aligned with the center of the second harmonic generator 44, all energy of the laser beam is inputted into the second harmonic generator 44, so that the output of the second harmonic generator 44 and the output of the power monitor 47 are maximized.

At the time of start-up, the laser module 40 estimates positions of the movable members 8 respectively by applying the inclination driving voltages to the vibratory driving devices 1. For this purpose, the controller 4 compares detected rising waveforms with referential waveforms which takes into account inertias of the movable members involving alignment lenses 42, 43. Then the controller 4 calculates distances between the estimated positions of the movable members 8 and respective designed center positions of the movable members 8, and causes the driving circuit 3 to output the frictional driving voltages with a duty ratio and a number of pulses which move the movable member 8 to the respective center position.

Then, the laser module 40 starts to align the laser beam with a wobbling operation in which the movable member 8 is displaced back and forth by a minute amount. In the wobbling operation, the driving circuit 3 applies to the actuator 2, at first, two pulses of the frictional driving voltage for advancing the movable member 8, 5 msec later, four pulses of the frictional driving voltage for retreating the movable member 8, and further 5 msec later, two pulses of the frictional driving voltage for advancing the movable member 8. Thereby, the movable member 8 is moved back and forth.

The controller 4 monitors the output of the power monitor 47 during the wobbling operation, calculates a difference between the output when the movable member 8 is advanced and the output when the movable member 8 is retreated, and causes the driving circuit 3 to output the frictional driving voltage with a duty ratio and a number of pulses which cause movement of the movable member 8 by a quantity proportional to the difference between the outputs. In the laser module 40, the optical axis of the laser beam focused by the alignment lenses 42, 43 can be thereby aligned with the center of the second harmonic generator 44, so that the output of the power monitor 47 is maximized.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A vibratory driving device comprising:
    a shaft-like driving member;
    an electromechanical transducer that inclines the driving member and displaces the driving member in an axial direction of the driving member,
    a movable member which slidably engages on the driving member;
    a driving circuit that applies 1) a periodical frictional driving voltage to the electromechanical transducer so as to displace the driving member back and forth with a speed varying asymmetrically in the axial direction to displace slidingly the movable member with respect to the driving member and 2) an inclination driving voltage that inclines the driving member,
    a waveform determiner which determines a rising condition of a voltage or a current of the electromechanical transducer when the inclination driving voltage is applied, and
    a position estimator which estimates a position of the movable member based on the rising condition of the voltage or the current.

2. The vibratory driving device according to claim 1, wherein the electromechanical transducer has a plurality of elongatable portions which can elongate and contract in the axial direction of the driving member respectively and which are provided in parallel with each other, and the electromechanical transducer holds one end of the driving member.

3. The vibratory driving device according to claim 2, wherein the number of the elongatable portions of the electromechanical transducer is two.

4. The vibratory driving device according to claim 3, wherein the waveform determiner determines the rising condition by applying a voltage to some of the elongatable portions and detecting a voltage or a current induced in another elongatable portion.

5. The vibratory driving device according to claim 2, wherein the waveform determiner determines the rising condition by applying a voltage to some of the elongatable portions and detecting a voltage or a current induced in another elongatable portion.

6. The vibratory driving device according to claim 1, wherein the electromechanical transducer elongates and contracts in the axial direction of the driving member and is partially restrained so as to restrict the elongation and contraction of the electromechanical transducer in an imbalanced manner.

7. The vibratory driving device according to claim 1, wherein the position estimator estimates the position of the movable member based on a difference between a rising waveform of the voltage or the current of the electromechanical transducer and a predetermined referential waveform.

8. An optical apparatus comprising:
- a vibratory driving device comprising:
  - a shaft-like driving member;
  - an electromechanical transducer that inclines the driving member and displaces the driving member in an axial direction of the driving member;
  - a movable member which slidably engages on the driving member;
  - a driving circuit that applies 1) a periodical frictional driving voltage to the electromechanical transducer so as to displace the driving member back and forth with a speed varying asymmetrically in the axial direction to displace slidingly the movable member with respect to the driving member and 2) an inclination driving voltage that inclines the driving member;
  - a waveform determiner which determines a rising condition of a voltage or a current of the electromechanical transducer when the inclination driving voltage is applied; and
  - a position estimator which estimates a position of the movable member based on the rising condition of the voltage or the current; and
- an optical member held by the movable member of the vibratory driving device, wherein the optical member is positioned based on a position of the movable member estimated by the position estimator.

* * * * *